(12) United States Patent
Nilsson et al.

(10) Patent No.: US 6,357,144 B1
(45) Date of Patent: Mar. 19, 2002

(54) TWO STAGE PROCESS FOR DRYING OF RAW WOOD MATERIAL

(75) Inventors: Lars Nilsson, Växjö ; Stefan Backa, VästerÅs; Ulf Persson, Örsundsbro, all of (SE)

(73) Assignee: Valmet Fibertech AB, Sundsvall (SE)

( * ) Notice: Subject to any disclaimer, the term of this patent is extended or adjusted under 35 U.S.C. 154(b) by 0 days.

(21) Appl. No.: 09/485,344

(22) PCT Filed: Aug. 14, 1998

(86) PCT No.: PCT/SE98/01472

§ 371 Date: Feb. 8, 2000

§ 102(e) Date: Feb. 8, 2000

(87) PCT Pub. No.: WO99/09364

PCT Pub. Date: Feb. 25, 1999

(30) Foreign Application Priority Data

Aug. 14, 1997 (SE) ................................................ 9702938

(51) Int. Cl.$^7$ .................................................. F26B 3/00
(52) U.S. Cl. .............................. 34/467; 34/477; 34/514; 110/224
(58) Field of Search .......................... 34/443, 467, 476, 34/477, 514, 72; 110/221, 224

(56) References Cited

U.S. PATENT DOCUMENTS

| 4,213,947 A | | 7/1980 | Fremont et al. | |
| 5,588,222 A | * | 12/1996 | Thompson | 34/379 |
| 5,603,751 A | * | 2/1997 | Ackerson | 95/268 |

FOREIGN PATENT DOCUMENTS

WO          9425812         11/1994

* cited by examiner

*Primary Examiner*—Jiping Lu
(74) *Attorney, Agent, or Firm*—Young & Thompson

(57) ABSTRACT

Method for drying wood raw material (10) by means of hot gases (20) supplied to the drying process, in which VOC, apart from water, evaporate from the wood raw material into the gases. The drying process is divided and carried out in at least two sub-steps (I, II), from which process gas (22, 33) is removed separately, and the drying process is thus controlled that VOC evaporate during one of the sub-steps, and the VOC are concentrated to this sub-step. The temperature of the gas containing VOC is increased to a temperature exceeding 180° C. before VOC are oxidized catalytically at said elevated temperature, in order to reduce the discharge of VOC from the drying process.

18 Claims, 2 Drawing Sheets

TWO STAGE PROCESS FOR DRYING OF RAW WOOD MATERIAL

FIELD OF THE INVENTION

The present invention relates to a method for drying wood. More precisely, the inventive method relates to a method for drying wood comprising steps to efficiently eliminate or reduce, from the drying gases, terpenes and other volatile organic compounds, which are forced out of the wood during the drying process.

PRIOR ART

Wood raw material such as bio-fuel, chips or fibres are dried before being used for energy production or for manufacturing wood based boards, such as particle boards or oriented strand boards. During the drying process, terpenes and other volatile organic compounds are aforced out. Such organic compounds are often referred to as VOC—short for Volatile Organic Compounds—and they will be thus denoted in the following. VOC evaporate along with moisture for instance, into the gases which during the drying process flow through the drying device and the wood material, and leave the drying device along with said moisture containing waste gases from the process. Normally the temperature of the waste or process gases vented during the drying process is between 80° C.–150° C., depending on the residual moisture contents of the wood material. Depending on the drying conditions, and to some extent on the composition of the wood raw material, essentially all VOC evaporate during the initial stages of the drying process while, under other conditions or with other compositions, essentially all VOC evaporate during the final stages of the drying process. Since it is desired to reduce the discharged amount of VOC, the VOC present in the process gases are destroyed, normally using either catalytic or thermal oxidation. In order to secure an efficient destruction of the VOC present in the process gases, the exhaust gases are heated to a temperature of approximately 350° C. for catalytic oxidation, and 850° C. for thermal oxidation. A required gas temperature for achieving sufficient oxidation is determined by the composition of the waste gases, which varies according to the composition, type and quality of the wood raw material. According to prior art, the waste gases are heated to the elevated temperature by means of a complicated and costly system, comprising heat exchangers of regenerating or recuperative type, where the heat of the waste gases, from which the VOC have been eliminated, is used for heating the gases still containing VOC, before they are delivered to the reactor. It is often, however, necessary to supply additional heat to the waste gases upstreams or in the reactor, in order to achieve the desired reduction of the VOC contents. According to prior art, the waste gases are vented from the drying device in only one place. This means that the whole amount of process gas leaving the drying device has to be preheated prior to oxidation in the reactor. This, together with the fact that the process gases often are heated to a higher temperature than necessary in order to secure an efficient reduction of the VOC discharge from the drying device, leads to increasing demands on, and size of, the heat exchange system arranged at the reactor, as well as an increased required energy for the destruction of VOC, and for the drying process as a whole.

AIM OF THE INVENTION

The primary aim of the invention is to provide a method for drying wood raw material, comprising a destruction of VOC evaporated during the drying with a more efficient use of energy, and lower investment needs. The inventive method is cost efficient, with low maintenance requirements and a low energy needs, which secures the oxidation of essentially all of the VOC which evaporate into the drying gases prior to venting the waste gases into the atmosphere.

Another aim of the invention is to provide a method for drying wood raw material which, irrespective of variations regarding the type, composition and quality of the wood raw material, secures the oxidisation of all of the VOC evaporated into the drying gases before venting the drying gases into the atmosphere.

Further advantages of the present invention are apparent from the following description of the invention, and from the described preferred embodiments.

THE INVENTION

In order to achieve said results, the present invention suggests a method for drying wood raw material, where the wood raw material is dried in at least two sub-steps, the drying being controlled so that essentially all VOC are removed during one sub-step, and so that said VOC from the wood raw material is concentrated in the process gas which is removed during the sub-step, the gas being separated from the remaining process gases. The gas containing VOC is heated before it is transferred to a reactor where it is oxidised catalytically, at a gas temperature which exceeds 180° C. A suitable gas temperature for the oxidisation of the VOC is from 200° C. to 500° C. Preferably the VOC is oxidised within a temperature interval from 200° C. to 350° C. The increase in gas temperature to a level which is necessary for catalytic oxidisation in the reactor is achieved by mixing the drying gases, with hot gases upstreams from the reactor, preferably combustion flue gases. By dividing the drying process into two or more sub-steps, while at the same time controlling the drying process so that the VOC is removed from the wood during one of the sub-steps, which leads to the concentration of essentially all of the VOC in the gases which are removed from the sub-step, the amount of gas to be treated is reduced significantly. At the same time, the VOC concentration in the amount of process gas to be treated is increased. Preferably the process gases, which no longer contain VOC, are returned to the drying process as drying gas. Process gas which has been treated in the catalytic oxidation reactor is supplied to the drying process as drying gas, downstreams from the reactor, in a different sub-step in the drying process.

According to a preferred embodiment of the invention, the wood raw material is dried in an essentially continuous process, comprising at least two sub-steps. Sub-flows of process gas are removed from the different sub-steps and the drying process is controlled so that essentially all VOC evaporate from the wood raw material during one sub-step, thereby concentrating essentially all the VOC to the sub-flow from said sub-step. The gas temperature in said sub-flow is increased before the VOC are removed by catalytic oxidisation at an elevated temperature in a reactor.

As was described above, the process gas containing VOC is heated before oxidisation, preferably by mixing it with hot gases upstreams from the reactor. According to a preferred embodiment of the invention, hot drying gases are used for increasing the temperature to a required level before oxidisation of VOC in the reactor. After oxidisation in the reactor, the process gas, now relieved from its VOC contents, is transferred to a further process step. Normally, the hot drying gases are generated by combustion of a suitable fuel, such as oil, gas or wood or other suitable bio-fuel. It may be suitable to use waste material from the on-site production facility in this fuel. As an alternative or complement to the combustion gases, it is of course possible to use other heat sources, such as gas heaters based on electrical resistance elements, heat exchangers for extracting excess heat from the drying process or, even better, from another process with waste gases with a high heat content.

It has, during application of the inventive process, turned out that in order to achieve an efficient decrease of the VOC contents in the process gas, the gas temperature should exceed 180° C. It is advantageous to heat the process gas, before the oxidation, to a gas temperature in the interval between 200° and 500° C. Preferably a gas temperature in the interval between 200° C. and 350° C. is chosen, in order to secure the destruction of essentially all the VOC, without unnecessarily influencing the energy efficiency in a negative way.

DRAWINGS

The invention will in the following be explained in closer detail, and be exemplified with preferred embodiments, with reference to the appended drawings.

DETAILED DESCRIPTION OF THE INVENTION

Figure 1:
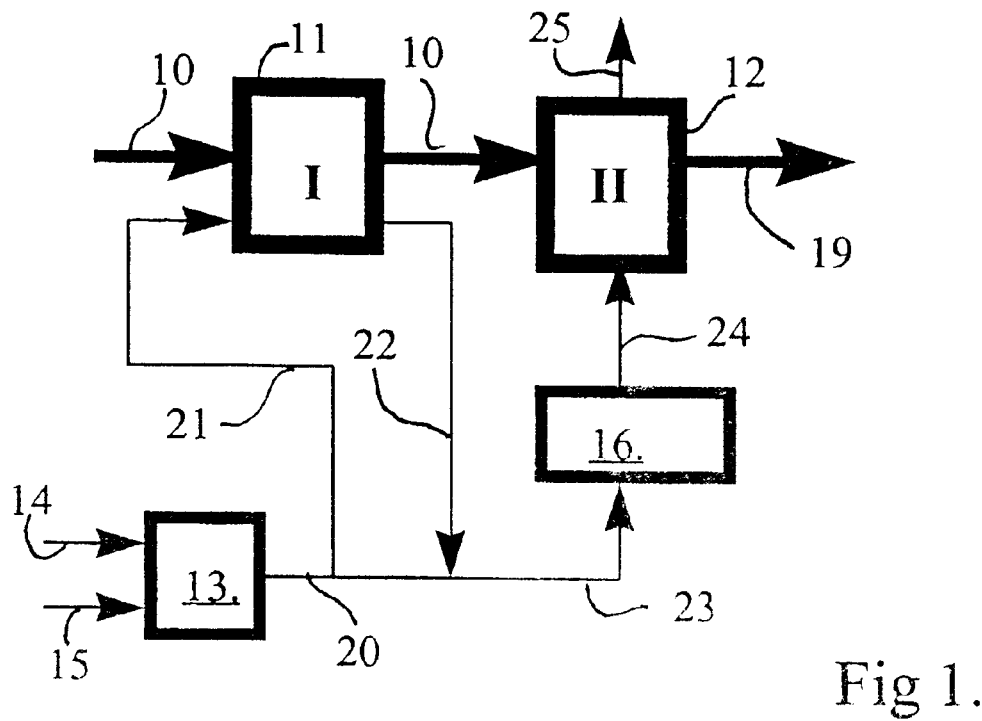
FIG. 1 illustrates, schematically, a two step method for drying wood raw material according to a preferred embodiment of the invention.

According to the preferred embodiment of the invention, shown in FIG. 1, the wood raw material is dried by means of a two step method. Wet wood raw material 10 is supplied to the process in step 1, I, in which it is processed, whereupon the wood material 10 is transferred to step 2, II, in which it is processed further, before it leaves the process as dried wood raw material 19. In FIG. 1, this two step method is shown as a continuous or semi-continuous process where the wood material 10 passes through two drying devices or drying chambers 11, 12, e.g. drying ovens or autoclaves— the flow of the wood raw material 10 is denoted by filled bold face arrows. Drying gas 20, in the form of hot gases, is generated in some kind of gas generator 13 as described above, e.g. by combustion of a fuel such as wood waste material 14, in the presence of combustion air 15. Part of said hot drying gas 21 is provided to the drying oven 11 where the wood material 10 is processed during step 1, I, by allowing the drying gas 21 to pass through or over the wood material 10, making VOC and water evaporate from the wood material. The conditions inside oven 11 are controlled such, that VOC evaporated from the wood material are concentrated to step 1, 1. Process gas 22 is vented from step 1, 1, and mixed with hot drying gas 20 so that the temperature of the process gas is increased. The heated process gas 23 is introduced into a reactor 16 in which the VOC are oxidised. Then the process gas 24 coming from the reactor 16, which has been relieved from its VOC contents, is introduced into an oven 12 provided for step 2, II, of drying process. Process gas 25 is removed from step 2, II, and is preferably transferred to a conventional device for purifying exhaust gases, e.g. dust separation, not shown in the figures. In FIG. 1 a parallel flow is shown during step 1, I, and cross-flow is shown during step 2, II, only for the purpose of illustrating the process in a clear schematic way. Thus, the type of relation between the respective flows of the wood raw material and the drying gas through the drying facilities, essentially counter flow, cross-flow or parallel flow, may be chosen freely according to what is deemed suitable.

As an alternative to the continuous or semi-continuous process in which the wood raw material is processed in two drying devices 11, 12, the two step method according to this embodiment may be performed in batches, said wood raw material being introduced into a drying oven or an autoclave, processed with drying gas in a first step 1. Then the step 1 process gas is mixed with more drying gas and heated to a temperature suitable for catalytic oxidation. The VOC contained in the process gas is now oxidised before the process gas, now relieved from its VOC contents, is returned to the drying oven or autoclave, as drying gas for step 2.

Figure 2:
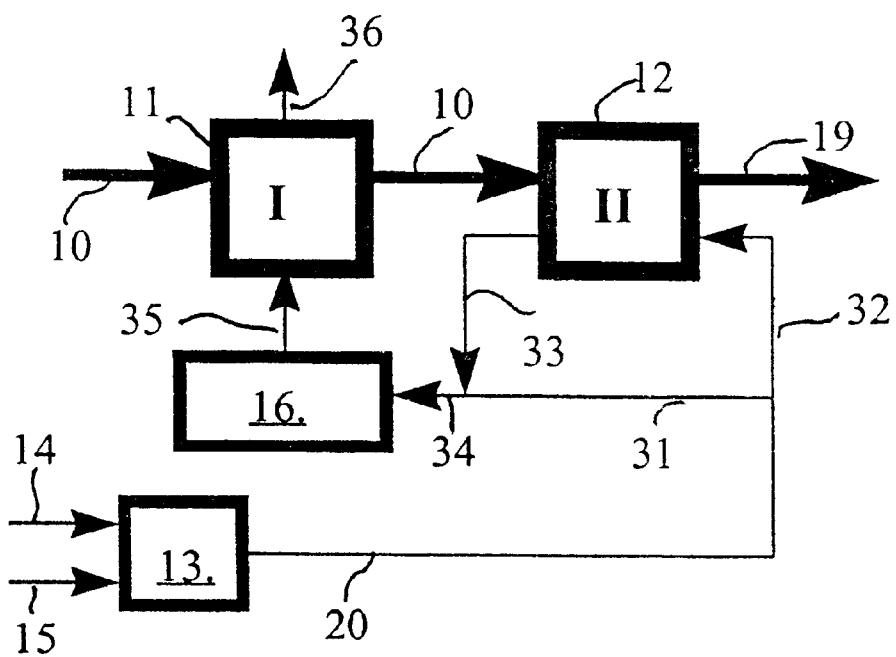
FIG. 2 illustrates, schematically, a two step method for drying wood raw material according to an alternative embodiment of the invention.

According to the alternative inventive two step method for drying wood raw material which is shown in FIG. 2, wet wood raw material is, in the above described way introduced into an oven or an autoclave 11, in which the wood material is processed in step 1, I. The wood material is transferred to a new autoclave 12, where it is processed further in step 2, II, before it leaves the process as dried wood raw material 19. Also according to this alternative embodiment, hot gases are used as drying gas 20, a part of said hot drying gas 32 being supplied to the drying process during step 2, in which it passes through or over the wood raw material, the conditions in the drying device 12 during step 2, II, being so controlled, that essentially all VOC is evaporated from the wood material during step 2. Process gas 33 is removed from the drying facility 12 for step 2, II, and is mixed with hot drying gas 31 in order to increase the temperature if the process gas. The heated process gas 34 is, after being heated, introduced into a reactor 16 in which the VOC are oxidised, after which the process gas 35 relieved from its VOC contents, downstreams of the reactor 16 is supplied as drying gas into a drying oven or autoclave 11 provided for step 1 of the drying process, where it passes through or over the wood raw material. Process gas 36 is removed from step 1, I, and is advantageously transferred to a conventional device for purification of process gases from a drying facility, not shown. In FIG. 2, cross-flow is shown in step 1, I, and counter-flow is shown in step 2, II, solely for the purpose of achieving a clear schematic illustration of the process. Thus, the type of relation between the flow of the wood raw material and the drying gases through the drying facility, essentially counter-flow, cross-flow or parallel flow, may also in this case be chosen freely according to what is deemed appropriate. In the application of said alternative drying process for drying batches of wood raw material, two batch processes should be run in parallel, so that process gas removed from step 2, II, in the one process can, after VOC oxidation, be provided to step 1, I, of the other process, in order to maintain an efficient use of energy.

Figure 3:
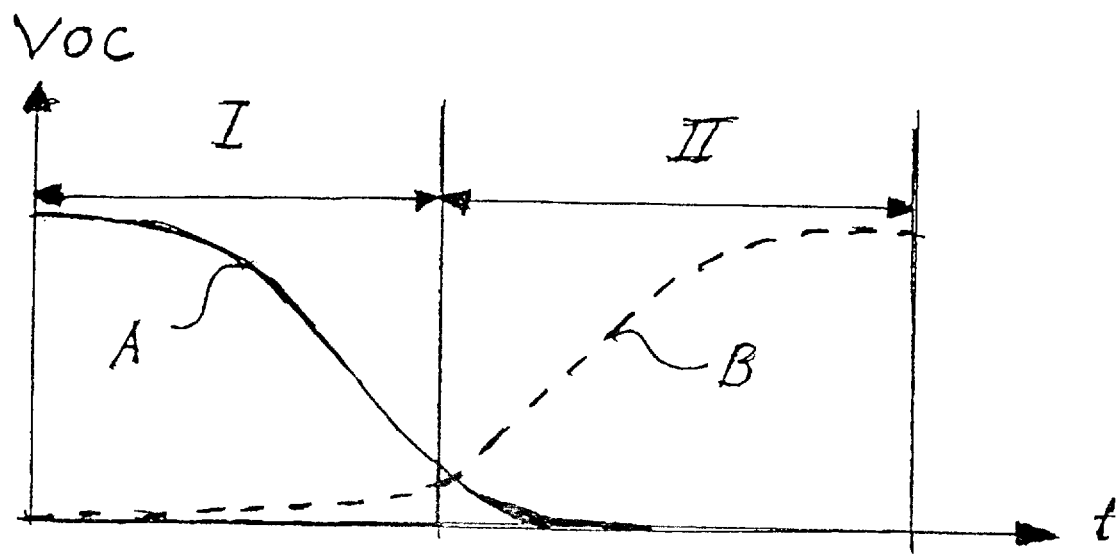
FIG. 3 illustrates, schematically, evaporated VOC over time, in the embodiments shown in FIG. 1 and FIG. 2.

The evaporation of VOC from the wood raw material over time, in carrying out the above described two step methods according to the present invention is shown in FIG. 3. The solid curve A shows that in carrying out the process according to FIG. 1, such conditions are upheld during step 1, I, that the evaporation of VOC from the wood raw material is essentially completed during said step 1, I, and that only a negligable amount of residual VOC evaporates during step 2, II. As can be seen from the dotted curve B, such conditions are upheld during step 1, I, that essentially no, or only negligable amounts of VOC evaporate, while such conditions are upheld during step 2, II, that VOC evaporation from the wood raw material essentially takes place during step 2, II. In order to achieve the desired VOC evaporation during the process, the process is controlled regarding process variables such as temperature, pressure, dew point, velocity of the drying gas flow, flow distribution in the oven, et c. The choice between a process with VOC evaporation according to curve A and a process with VOC evaporation according to curve B is made based on conditions such as the structure of the drying facility, type and composition of the wood raw material, and demands on the dried wood material in a subsequent process or use.

What is claimed is:

1. A method for drying wood raw material, the method comprising the steps of:
   supplying wet wood raw material to a first process step;
   supplying a hot drying gas to the first process step;
   partly drying the raw material in the first process step;
   supplying the partly dried raw material to a second process step;
   supplying a hot drying gas to the second process step;
   drying the partly dried raw material in the second process step;
   collecting process gases from the first and second process steps separately;
   controlling conditions only in one of the first and second process steps so that essentially all volatile organic compounds (VOC) in the raw material are evaporated and concentrated in the process gas collected in said one of the first and second process steps;
   mixing a hot drying gas with the collected process gas containing the VOC from said one of the first and second process steps;
   oxidizing the VOC catalytically by heating the mixture to a gas temperature exceeding 180° C. to remove the VOC from the mixture; and
   supplying the mixture that is relieved of the VOC to the other of the first and second process steps as the hot drying gas for the other of the first and second process steps.

2. The method according to claim 1, wherein the temperature in the oxidizing step is between 200° C. and 500° C.

3. The method according to claim 1, wherein the temperature in the oxidizing step is between 200° C. and 350° C.

4. The method according claim 1, wherein the hot drying gas mixed with the collected process gas is generated by combustion of a fuel.

5. The method according to claim 1, wherein the first and second process steps are carried out sequentially in two separate process chambers.

6. The method according to claim 1, wherein the first and second process steps are carried out sequentially in one process chamber.

7. A method for drying wood raw material, the method comprising the steps of:
   supplying wet wood raw material to a first process step;
   supplying a first hot drying gas to the first process step;
   partly drying the raw material in the first process step using the first hot drying gas;
   controlling conditions only in the first process step so that essentially all volatile organic compounds (VOC) in the raw material are evaporated and concentrated in a process gas in the first process step;
   collecting the process gas containing the VOC from the first process step;
   mixing the first hot drying gas with the collected process gas containing the VOC;
   oxidizing the VOC catalytically by heating the mixture to a gas temperature exceeding 180° C. to remove the VOC from the mixture;
   supplying the partly dried raw material to a second process step;
   supplying the mixture that is relieved of the VOC to the second process step as a second hot drying gas for the second process step; and
   drying the partly dried raw material in the second process step using the second hot drying gas.

8. The method according to claim 7, wherein the temperature in the oxidizing step is between 200° C. and 500° C.

9. The method according to claim 7 wherein the temperature in the oxidizing step is between 200° C. and 350° C.

10. The method according to claim 7, wherein the first hot drying gas is generated by combustion of a fuel.

11. The method according to claim 7, wherein the first and second process steps are carried out sequentially in two separate process chambers.

12. The method according to claim 7, wherein the first and second process steps are carried out sequentially in one process chamber.

13. A method for drying wood raw material, the method comprising the steps of:
   supplying wet wood raw material to a first process step;
   supplying a first hot drying gas to the first process step;
   partly drying the raw material in the first process step using the first hot drying gas;
   supplying the partly dried raw material to a second process step;
   supplying a second hot drying gas to the second process step;
   drying the partly dried raw material in the second process step using the second hot drying gas;
   controlling conditions only in the second process step so that essentially all volatile organic compounds (VOC) in the raw material are evaporated and concentrated in a process gas in the second process step;
   collecting the process gas containing the VOC from the second process step;
   mixing the second hot drying gas with the collected process gas containing the VOC;
   oxidizing the VOC catalytically by heating the mixture to a gas temperature exceeding 180° C. to remove the VOC from the mixture; and
   supplying the mixture that is relieved of the VOC to the first process step as the first hot drying gas for the first process step.

14. The method according to claim 13, wherein the temperature in the oxidizing step is between 200° C. and 500° C.

15. The method according to claim 13, wherein the temperature in the oxidizing step is between 200° C. and 350° C.

16. The method according to claim 13, wherein the second hot drying gas is generated by combustion of a fuel.

17. The method according to claim 13, wherein the first and second process steps are carried out sequentially in two separate process chambers.

18. The method according to claim 13, wherein the first and second process steps are carried out sequentially in one process chamber.

* * * * *